US 008782242B2

(12) United States Patent
Ahmad et al.

(10) Patent No.: US 8,782,242 B2
(45) Date of Patent: Jul. 15, 2014

(54) SOFTWARE APPLICATION PLACEMENT USING COMPUTING RESOURCE CONTAINERS

(75) Inventors: Irfan Ahmad, Mountain View, CA (US); Anne Marie Holler, Los Altos, CA (US); Mustafa Uysal, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 242 days.

(21) Appl. No.: 13/273,064

(22) Filed: Oct. 13, 2011

(65) Prior Publication Data

US 2013/0097319 A1 Apr. 18, 2013

(51) Int. Cl.
*G06F 15/173* (2006.01)

(52) U.S. Cl.
USPC .......................................... 709/226; 709/229

(58) Field of Classification Search
USPC ................. 709/212–219, 223, 225–226, 229; 718/1, 104
See application file for complete search history.

(56) References Cited

U.S. PATENT DOCUMENTS

| 7,620,953 | B1 | 11/2009 | Tene et al. | |
| 7,757,116 | B2 | 7/2010 | Brown et al. | |
| 7,934,035 | B2 | 4/2011 | Miloushev et al. | |
| 7,971,047 | B1* | 6/2011 | Vlaovic et al. | 713/1 |
| 7,996,719 | B2 | 8/2011 | Bernabeu-Auban et al. | |
| 8,112,527 | B2 | 2/2012 | Kawato | |
| 8,209,687 | B2 | 6/2012 | Yuyitung et al. | |
| 8,261,282 | B1* | 9/2012 | Ponnapur et al. | 718/105 |
| 8,352,611 | B2 | 1/2013 | Maddhuri et al. | |
| 8,423,998 | B2 | 4/2013 | Isci et al. | |
| 8,510,590 | B2 | 8/2013 | Ji et al. | |
| 8,533,724 | B1 | 9/2013 | Theimer et al. | |
| 2006/0136761 | A1 | 6/2006 | Frasier et al. | |
| 2008/0244569 | A1* | 10/2008 | Challener et al. | 718/1 |
| 2009/0007099 | A1* | 1/2009 | Cummings et al. | 718/1 |
| 2009/0037585 | A1 | 2/2009 | Miloushev et al. | |
| 2009/0070771 | A1* | 3/2009 | Yuyitung et al. | 718/105 |
| 2009/0210527 | A1 | 8/2009 | Kawato | |
| 2009/0300414 | A1* | 12/2009 | Huang et al. | 714/11 |
| 2011/0214005 | A1* | 9/2011 | Biran et al. | 714/1 |
| 2011/0225277 | A1* | 9/2011 | Freimuth et al. | 709/223 |
| 2011/0231696 | A1* | 9/2011 | Ji et al. | 714/3 |
| 2011/0238803 | A1* | 9/2011 | Kern | 709/223 |
| 2011/0246627 | A1* | 10/2011 | Kern | 709/220 |
| 2011/0246992 | A1* | 10/2011 | Kern | 718/100 |
| 2011/0296429 | A1* | 12/2011 | Segmuller et al. | 718/104 |
| 2011/0302578 | A1 | 12/2011 | Isci et al. | |
| 2012/0042311 | A1* | 2/2012 | Biran et al. | 718/1 |
| 2012/0102199 | A1* | 4/2012 | Hopmann et al. | 709/226 |
| 2012/0123825 | A1* | 5/2012 | Biran et al. | 705/7.36 |

(Continued)

OTHER PUBLICATIONS

1. "Resource Management with VMware DRS", VMware, Inc., 2006.

*Primary Examiner* — Brendan Higa

(57) ABSTRACT

Embodiments associate software applications with computing resource containers based on placement rules. A placement rule indicates that a first software application is to be co-located with a second software application during execution of the first and second software applications, or that the first software application is to be separated from the second software application during execution of the first and second software applications. A target computing resource container is selected based on the placement rule and a computing resource container that is associated with the first software application. The second software application is associated with the target computing resource container, and the placement rule may be provided to the target computing resource container.

18 Claims, 6 Drawing Sheets

(56) References Cited

U.S. PATENT DOCUMENTS

| | | |
|---|---|---|
| 2012/0266166 A1 | 10/2012 | Farkas et al. |
| 2012/0324071 A1 | 12/2012 | Gulati et al. |
| 2012/0324112 A1 * | 12/2012 | Dow et al. ............... 709/226 |
| 2013/0042003 A1 | 2/2013 | Franco et al. |
| 2013/0047006 A1 | 2/2013 | Brown et al. |
| 2013/0067277 A1 | 3/2013 | Mummidi |
| 2013/0097601 A1 | 4/2013 | Podvratnik et al. |
| 2013/0263120 A1 | 10/2013 | Patil et al. |

* cited by examiner

SOFTWARE APPLICATION PLACEMENT USING COMPUTING RESOURCE CONTAINERS

BACKGROUND

Software applications, such as virtual machines (VMs), may be executed by a group or "cluster" of host computing devices. A management device may coordinate execution of the software applications by hosts, ensuring, for example, that at least one instance of a particular software application is available whenever possible, or that the computing load associated with execution of software applications is distributed across hosts in the cluster.

A management device may control which host(s) executes, and/or stores data related to, a software application, also known as the "placement" of the software application. Further, software application placement may be governed by placement rules that specify a desired placement of a software application with respect to another software application. For example, an affinity rule specifies that a software application should be co-located with one or more other software applications, whereas an anti-affinity rule specifies that a software application should be separated from one or more other software applications.

Placement rules may be enforced against specific computing resources, such as hosts or storage devices. For example, an anti-affinity rule may be enforced by preventing two VMs from being placed on the same host. However, the goal of a placement rule—that two instances of the same software application not be associated with the same point of failure, for example—may not be consistently achieved by simply placing the software applications on different resources. For example, different resources may be correlated in terms of failures and/or performance, such that a failure or performance degradation associated with one resource is likely to be concurrent with a similar failure or performance degradation of another resource.

Further, in some scenarios, a management device may have limited access to computing resources, such that enforcement of placement rules by the management device alone may be infeasible. For example, computing resources such as distributed computing resources and data storage resources, may be managed by a computing resource container that allocates computing resource utilization among a plurality of hardware devices and prevents direct access to such hardware devices by the management device. In such scenarios, the management device may attempt to satisfy an affinity rule by placing affined software applications in the same computing resource container, for example. Similarly, the management device may attempt to satisfy an anti-affinity rule by ensuring that anti-affined software applications are never placed in the same computing resource container. Such approaches may result in undesired consequences, such as affined software applications being placed on different hardware devices by the computing resource container, or a portion of anti-affined software applications not being placed on any computing resource when a limited quantity of computing resource containers is available.

SUMMARY

One or more embodiments described herein facilitate enforcing software application placement rules even when computing resources are managed by computing resource containers and not directly accessible to a management device.

A placement rule may include an affinity rule indicating that a first software application is to be co-located with a second software application during execution of the first and second software applications, or an anti-affinity rule indicating that the first software application is to be separated from the second software application during execution of the first and second software applications. A target computing resource container is selected based on the placement rule and a computing resource container that is associated with the first software application. The second software application is associated with the target computing resource container. When the second software application is associated with the same computing resource container that is associated with the first software application, the placement rule may be provided to the target computing resource container, such that the target computing resource container may enforce the placement rule.

This summary introduces a selection of concepts that are described in more detail below. This summary is not intended to identify essential features, nor to limit in any way the scope of the claimed subject matter.

DETAILED DESCRIPTION

Embodiments described herein facilitate enforcing placement rules based on information about failure correlation between computing resources and/or by delegating enforcement of a placement rule to a computing resource container in which software applications are placed.

In exemplary embodiments, failure correlations between computing resources are determined, and "anti-affined" software applications (e.g., software applications that are to be separated per an anti-affinity rule) are placed on computing resources with relatively low failure correlation. Further, the failure correlations may be repeatedly determined, and changes in failure correlation may result in the migration of software applications. For example, a software application may be migrated from a first computing resource to a second computing resource based on an increase in the failure correlation between the first computing resource and the computing resource on which an anti-affined software application is placed.

Further, in exemplary embodiments, a placement rule is provided to a computing resource container when placing affined or anti-affined software applications in the same computing resource container. The computing resource container enforces the placement rule when allocating the software applications to computing resources managed by the computing resource container, enabling the placement rule to be satisfied even though the individual computing resources may be inaccessible outside the computing resource container. For example, the computing resource container may ensure that affined software applications are associated with the same computing resource, and that anti-affined software applications are associated with different computing resources.

Figure 1:
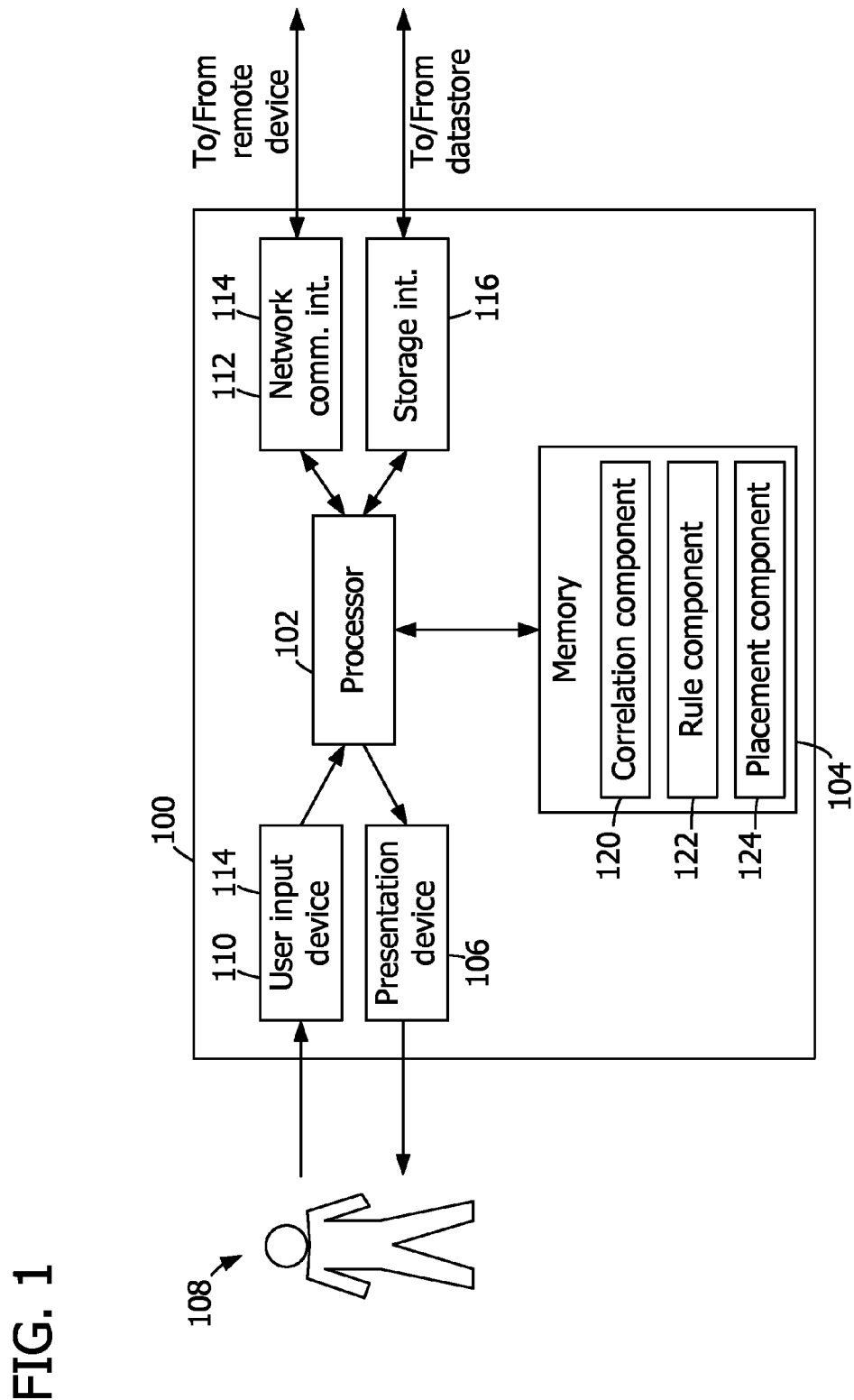
FIG. 1 is a block diagram of an exemplary computing device.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, software applications, placement rules (e.g., affinity rules and/or anti-affinity rules), failure correlations, performance correlations, performance metrics, configuration hierarchies, associations of software applications with computing resources and/or computing resource containers, and/or other data, to be stored and retrieved. For example, memory 104 may include one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information from a user.

Computing device 100 further includes a storage interface 116 that enables computing device 100 to communicate with one or more datastores, which store virtual disk images, software applications, data associated with software applications, and/or any other data suitable for use with the methods described herein. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

In exemplary embodiments, memory 104 stores computer-executable instructions for performing one or more of the operations described herein. Memory 104 may include one or more computer-readable storage media that have computer-executable components embodied thereon. In the example of FIG. 1, memory 104 includes a correlation component 120, a rule component 122, and a placement component 124.

When executed by processor 102, correlation component 120 causes processor 102 to determine a plurality of failure correlations between a plurality of computing resources. Each failure correlation corresponds to a pair of computing resources and is determined based on a failure correlation received from a user, a failure correlation received from a resource manager associated with the pair of computing resources, a configuration hierarchy indicating hardware associated with the pair of computing resources, and/or performance metrics associated with the pair of computing resources.

When executed by processor 102, rule component 122 causes processor 102 to receive via an input interface a placement rule, such as an affinity rule indicating that a first software application is to be co-located with a second software application during execution of the first and second software applications, or an anti-affinity rule indicating that the first software application is to be separated from the second software application during execution of the first and second software applications. Rule component 122 also causes processor 102 to select failure correlations corresponding to a first computing resource, which is associated with the first software application, and to select one of the plurality of computing resources other than the first computing resource that corresponds to a lowest failure correlation among the selected failure correlations. In addition, or alternatively, rule component 122 causes processor 102 to select a target computing resource container based on the placement rule and a computing resource container that is associated with the first software application.

When executed by processor 102, placement component 124 causes processor 102 to associate the second software application with the selected computing resource based on the anti-affinity rule. In addition, or alternatively, placement component 124 may cause processor 102 to transmit a placement request associated with the second software application to the target computing resource container via a communication interface, and to transmit the placement rule to the target computing resource container via the communication interface.

Embodiments are described herein with reference to virtual machines (VMs). However, it is contemplated that the methods described may be applied to any type of software application.

Figure 2:
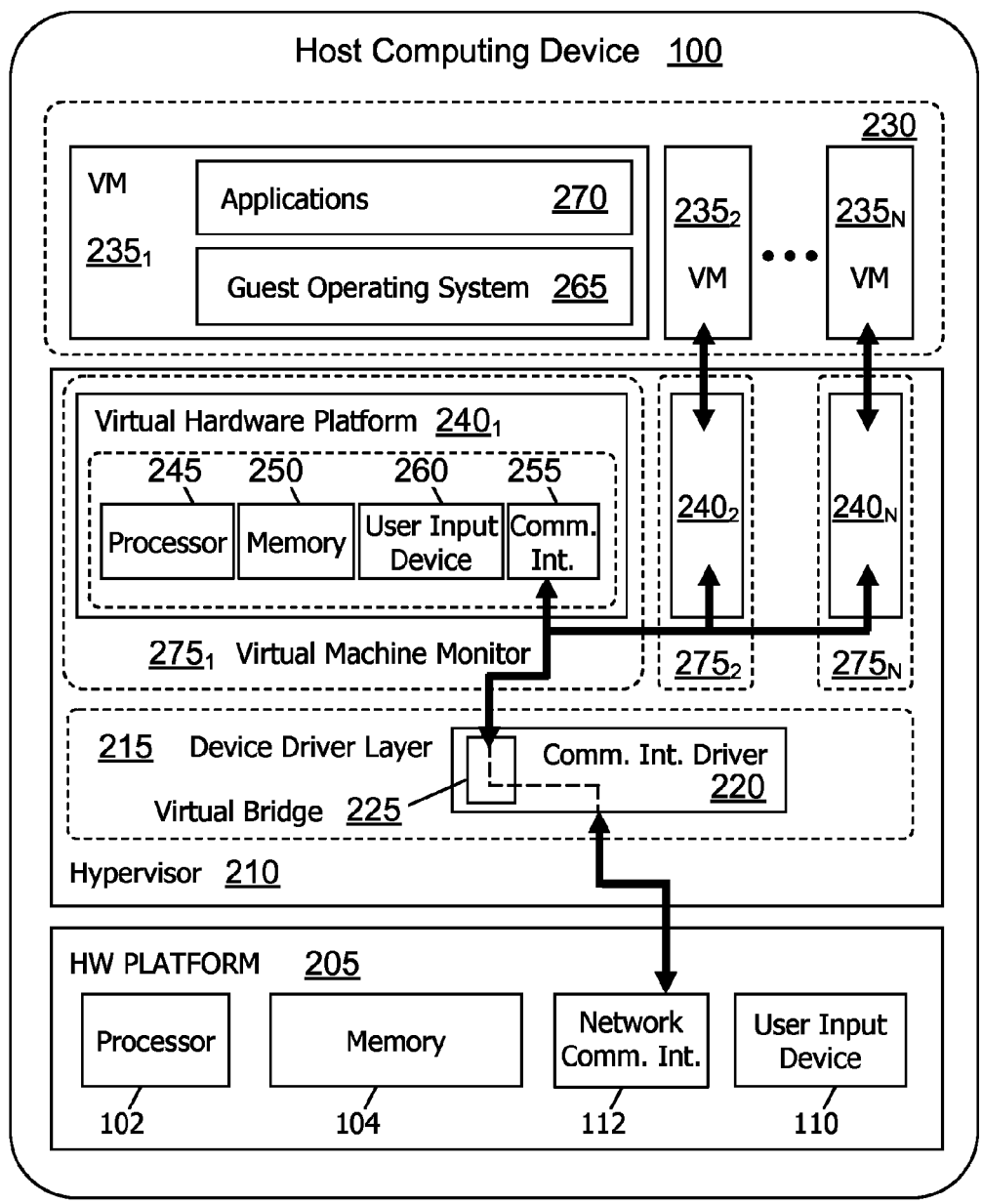
FIG. 2 is a block diagram of virtual machines that are instantiated on a computing device, such as the computing device shown in FIG. 1.

FIG. 2 depicts a block diagram of VMs $235_1, 235_2 \ldots 235_N$ that are instantiated on a computing device 100, which may be referred to as a host computing device or simply a host. Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as a datastore or a data storage container (e.g., in a storage area network, or SAN, configuration). In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
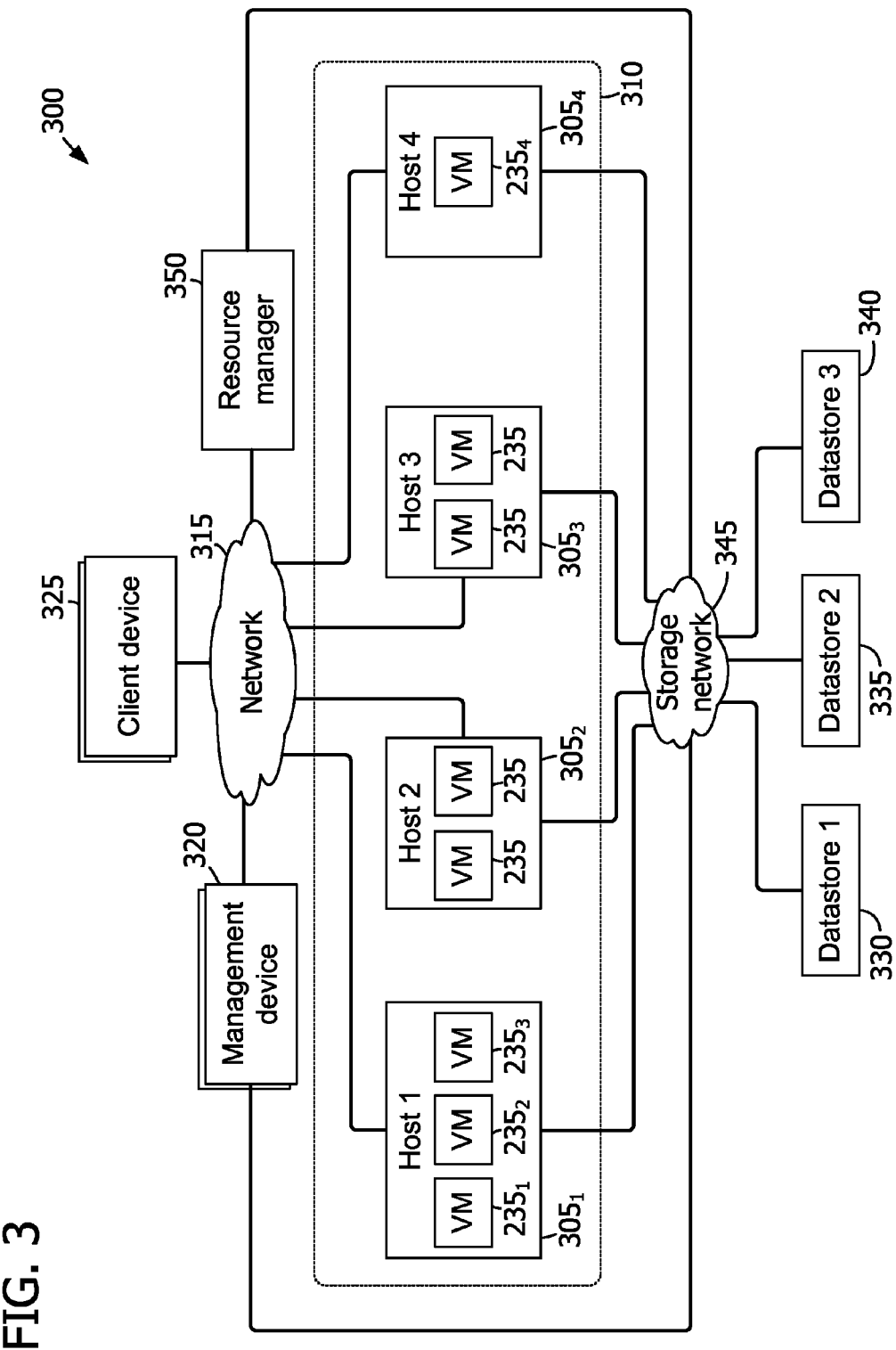
FIG. 3 is a block diagram of an exemplary cluster system including computing devices and virtual machines.

FIG. 3 is a block diagram of an exemplary cluster system 300 of hosts 305 and virtual machines (VMs) 235. Cluster system 300 includes a fault domain 310 with a first host $305_1$, a second host $305_2$, a third host $305_3$, and a fourth host $305_4$. Each host 305 executes one or more software application. For example, first host $305_1$ executes first VM $235_1$, second VM $235_2$, and third VM $235_3$, and fourth host $305_4$ executes fourth VM $235_4$. It is contemplated that fault domain 310 may include any quantity of hosts 305 executing any quantity of software applications. Further, VMs 235 hosted by hosts 305 may execute other software applications, such as instances of network services (e.g., web applications and/or web services), distributed computing software, and/or any other type of software that is executable by computing devices 100 (shown in FIG. 1) such as hosts 305.

Hosts 305 communicate with each other via a network 315. Cluster system 300 also includes one or more management devices 320, which are coupled in communication with hosts 305 via network 315. In exemplary embodiments, a management device 320 monitors and controls hosts 305. For example, management device 320 may monitor performance metrics (e.g., application performance metrics and/or host performance metrics) associated with hosts 305 and may further coordinate the execution of VMs and/or other software applications by hosts 305 based on the performance metrics. One or more client devices 325 are coupled in communication with network 315, such that client devices 325 may submit requests to hosts 305. For example, hosts 305 may execute instances of software applications that provide data in response to requests from client devices 325.

Although management device 320 is shown outside fault domain 310, the functions of management device 320 may be incorporated into fault domain 310. For example, management device 320 may be included in fault domain 310. Alternatively, the functions described with reference to management device 320 may be performed by one or more hosts 305, or VMs 235 executed by one or more hosts 305, in fault domain 310. Hosts 305, management device 320, and/or client device 325 may be computing devices 100.

Cluster system 300 includes a first datastore 330, a second datastore 335, and a third datastore 340. In exemplary embodiments, datastores 330, 335, 340 are stored in memory 104 (shown in FIG. 1) of one or more computing devices 100. For example, datastores 330, 335, 340 may be stored in an array of hard disk drives and/or solid state drives. Hosts 305 communicate with datastores 330, 335, 340 via a storage network 345. For example, storage network 345 may include a storage area network (SAN) using a protocol such as Fibre Channel and/or Internet Small Computer System Interface (iSCSI). As another example, storage network 345 may include a network-attached storage (NAS) system using a protocol such as Server Message Block (SMB) and/or Network File System (NFS). In exemplary embodiments, VMs 235 are associated with virtual disk images, configuration files, and/or other data stored in file systems provided by datastores 330, 335, 340. Although storage network 345 is illustrated as separate from network 315, in some embodiments, storage network 345 may be combined with network 315.

Cluster system 300 may also include a resource manager 350 that is coupled to network 315 and/or to storage network 345. Resource manager 350 is associated with (e.g., monitors and/or manages) computing resources, such as hosts 305 and/or datastores 330, 335, 340. In exemplary embodiments, resource manager 350 maintains, and provides to management device 320, a configuration hierarchy that indicates hardware associated with computing resources monitored and/or managed by resource manager 350. For example, a configuration hierarchy may indicate the datacenters included in a facility, the server racks included in a datacenter, the server enclosures included in a rack, the hosts included in a server enclosure, and the disks included in a host. Similarly, a configuration hierarchy may indicate communication links (e.g., network paths) that are used by computing resources.

Figure 4:
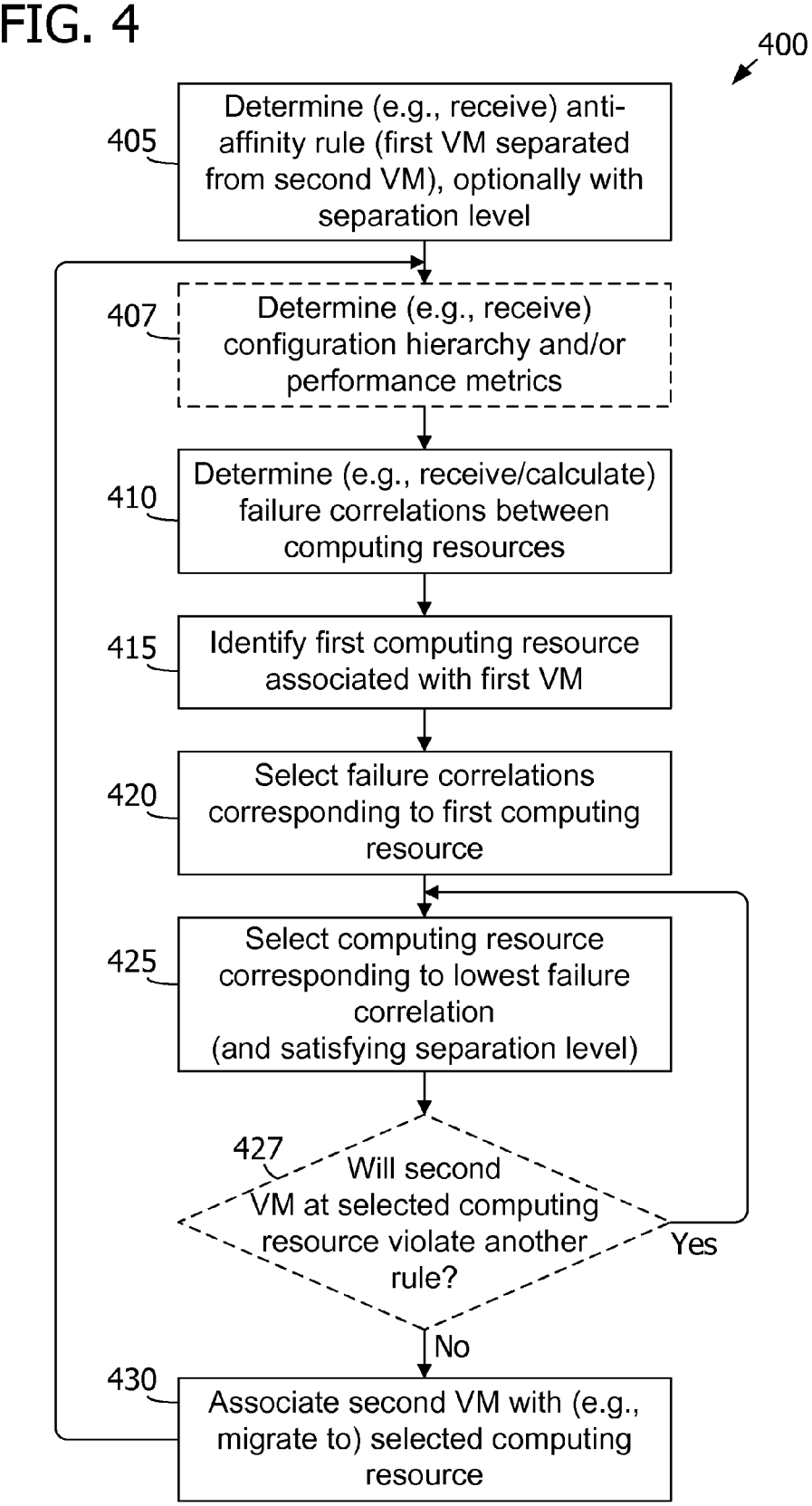
FIG. 4 is a flowchart of an exemplary method for associating a software application with a computing resource based on failure correlation information.

FIG. 4 is a flowchart of an exemplary method 400 for associating a software application with a computing resource based on failure correlation information. Although the operations in method 400 are described with reference to monitoring device 320 (shown in FIG. 3), it is contemplated that any portion of such operations may be performed by any computing device 100 (shown in FIG. 1). Further, computing resources such as hosts and datastores are described below, but method 400 may be practiced with respect to network equipment and/or any other computing resource used by software applications.

Referring to FIGS. 3 and 4, in exemplary embodiments, management device 320 determines 405 (e.g., receives via an input interface 114, shown in FIG. 1) an anti-affinity rule indicating that a first software application, such as first VM $235_1$, is to be separated from a second software application, such as second VM $235_2$, during execution of the first and second software applications. In addition, or alternatively, one or more anti-affinity rules (e.g., default rules or previously received rules) may be stored at management device 320.

Management device 320 determines 410 a plurality of failure correlations between a plurality of computing resources in cluster system 300, such as hosts 305 and/or datastores 330, 335, 340. Each failure correlation corresponds to a pair of computing resources and represents a probability that a failure of the first computing resource in the pair will be concurrent with a failure of the second computing resource in the pair.

A failure correlation may be expressed as a value between a minimum value, representing no correlation of failures between the pair of computing resources, and a maximum value, representing a highest possible correlation of failures between the pair of computing resources. For example, a failure correlation may be expressed as a binary value, with false or zero representing no correlation of failures, and true or one representing a correlation of failures. As another example, a failure correlation may be expressed as a real number (e.g., an integer or a floating point value) and/or as an element of an enumeration (e.g., values such as low, medium, and high) within a range specified by the minimum value and the maximum value. Whether binary, real, or enumerated, failure correlations corresponding to two pairs of computing resources may be compared, with the lower failure correlation indicating a lower probability that failures are correlated between the corresponding pair of computing resources.

In exemplary embodiments, management device 320 determines 410 a failure correlation between a pair of computing resources based on a failure correlation (e.g., a manually entered value) received from a user, a failure correlation from a resource manager associated with the pair of computing resources, a configuration hierarchy indicating hardware associated with the pair of computing resources, and/or performance metrics associated with the pair of computing resources.

In some embodiments, management device 320 determines 407 (e.g., accesses and/or receives) a configuration hierarchy that indicates hardware associated with the pair of computing resources. For example, hosts included in the same server enclosure or in the same server rack may share a power source and/or a communication link to network 315. Accordingly, failures between such hosts may be more highly correlated than failures between either of such hosts and a host in another server rack or another datacenter. Similarly, failures between datastores provided by the same disk or disk array may be more highly correlated than failures between either of such datastores and a datastore provided by another disk array or another datacenter. In some embodiments, a highest level in the hierarchy at which the computing resources are associated with the same hardware is determined, and the failure correlation is positively correlated with (e.g., proportional to) the distance from this level to the top of the configuration hierarchy.

In some embodiments, management device determines 407 (e.g., accesses and/or receives) performance metrics associated with a pair of computing resources and determines 410 a failure correlation based on the performance metrics. For example, a performance correlation indicated by such performance metrics (e.g., concurrent performance degradations) may be used to infer a failure correlation. Performance metrics may include input/output (I/O) latency, I/O throughput, network latency, network bandwidth, and/or any other measurement indicating the performance of a computing resource. Performance metrics may be collected during normal operation of a computing resource. In addition, or alternatively, performance metrics may be collected while intentionally inducing a performance degradation of one or more computing resources, such as by saturating a communication link used by a computing resource with I/O traffic and/or network traffic. In some embodiments, a performance correlation corresponding to a first computing resource and a second computing resource is calculated by creating a parallel time series of the first and second performance metrics associated with the first and second computing resources, respectively. The failure correlation may be determined 410 based on (e.g., may be equal to) the performance correlation.

In some embodiments, management device 320 determines 410 a failure correlation between a first computing resource and a second computing resource using one of the techniques described above in an order of preference. In one example, when a failure correlation corresponding to the first and second computing resources is indicated by a user, management device 320 determines the failure correlation based on the failure correlation indicated by the user. When no failure correlation corresponding to the first and second computing resources is indicated by a user, and a failure correlation is indicated by a resource manager associated with the first and second computing resources, management device 320 determines the failure correlation based on the failure correlation indicated by the resource manager. When no failure correlation corresponding to the first and second computing resources is indicated by a user or by a resource manager, management device 320 determines the failure correlation based on performance metrics associated with the first and second computing resources.

Management device 320 identifies 415 the computing resource(s) associated with first VM $235_1$. For example, management device 320 may store associations of software applications with computing resources and/or may receive such associations from resource manager 350. In the scenario described, first VM $235_1$ is associated with a first computing resource, such as first datastore 330 or first host $305_1$. For example, a virtual disk associated with first VM $235_1$ may be stored in first datastore 330 and/or first VM $235_1$ may be currently executed by first host $305_1$.

Management device 320 selects 420, from the determined failure correlations, the failure correlations corresponding to the first computing resource. For example, if the first computing resource is first datastore 330, management device 320 selects 420 second datastore 335 and third datastore 340.

In exemplary embodiments, management device 320 selects 425 the computing resource that corresponds to a lowest failure correlation among the plurality of failure correlations selected 420. For example, if failure correlations are expressed as binary values, management device 320 selects 425 a computing resource corresponding to a failure correlation of zero (also referred to as false) over a computing resource corresponding to a failure correlation of one (also referred to as true). As another example, if failure correlations are expressed as real numbers or enumerated values, management device 320 selects 425 a computing resource corresponding to a failure correlation closest to a predetermined minimum value (e.g., a failure correlation with a numerically lowest value) within the selected correlation values.

Based on the anti-affinity rule indicating that the first software application (e.g., first VM $235_1$) is to be separated from the second software application (e.g., second VM $235_2$), management device 320 associates 430 the second software application with the selected available computing resource. For example, if second VM $235_2$ is not currently associated with a computing resource, management device 320 may associate 430 second VM $235_2$ with the second computing resource by copying data associated with the second VM $235_2$ to a datastore or by instructing a host 305 to execute second VM $235_2$. Further, if second VM $235_2$ is currently associated with a computing resource, management device 320 may migrate second VM $235_2$ from a currently associated computing resource (e.g., second datastore 335) to the selected computing resource (e.g., third datastore 340), such as by deleting data associated with second VM $235_2$ from a datastore or by instructing a host 305 to terminate second VM $235_2$.

Some embodiments facilitate "soft" enforcement of an anti-affinity rule. In such embodiments, before associating 430 second VM $235_2$ with the selected computing resource, management device 320 determines 427 whether such an association 430 will violate a rule other than the anti-affinity rule being applied. The other rule may include another anti-affinity rule, an affinity rule, a rule governing the load (e.g., resource utilization) associated with the selected computing resource, and/or any other rule enforced by management device 320. If no other rule will be violated, management device 320 proceeds to associate 430 second VM $235_2$ with the selected computing resource. If another rule will be violated, and more computing resources are available, management device 320 disregards the selected computing resource and selects 425 the computing resource corresponding to the next lowest failure correlation.

If another rule will be violated and no more computing resources are available, management device 320 reports 428 a placement error. For example, management device 320 may store the placement error in a database, provide the placement error in a cluster management user interface, and/or transmit a notification of the placement error to another device (e.g., client device 325). Management device 320 proceeds to again determine 410 failure correlations, optionally determining 407 a configuration hierarchy and/or performance metrics, as described above. Accordingly, management device 320 may subsequently determine 427 that associating 430 the second VM with the selected computing resource will no longer violate a rule other than the anti-affinity rule and proceed to perform such an association 430.

Further, in some embodiments, a separation level is associated with the anti-affinity rule. The separation level indicates a level in a configuration hierarchy below which the first software application and the second application are to be separated. In such embodiments, management device 320 selects 425 the computing resource based further on determining that the selected computing resource is separate from the first computing resource at or above the separation level.

In exemplary embodiments, management device 320 performs method 400 repeatedly (e.g., periodically, continually, and/or upon request). Repeatedly performing method 400 facilitates detecting and responding to changing circumstances in cluster system 300. For example, management device 320 may determine 410 updated failure correlations indicating a change in the failure correlation between a particular pair of computing resources. As another example, management device 320 may identify 415 a change in the computing resource with which a software application is associated. Such changes may result in a violation of an anti-affinity rule, which can be corrected by management device 320, as described above.

In some embodiments, individual computing resources are not accessible by management device 320. For example, a computing resource container may allocate computing resource utilization among a plurality of computing resources (e.g., hardware devices) and prevent direct access to such computing resources by management device 320. A computing resource container may include, for example, a distributed computing container and/or a data storage container, such as a disk array controller and/or a cloud storage system.

Figure 5:
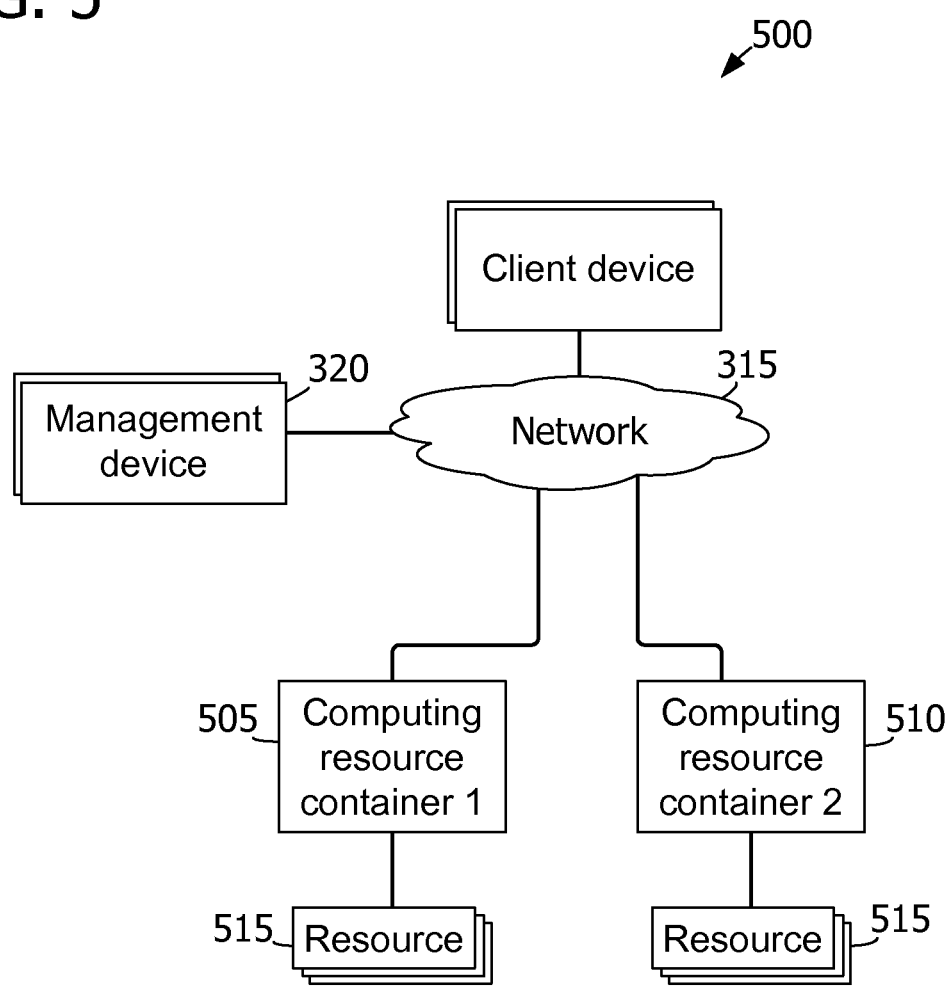
FIG. 5 is block diagram of an exemplary cluster system including computing resource containers.

FIG. 5 is a block diagram of an exemplary cluster system 500 including a first computing resource container 505 and a second computing resource container 510. First computing resource container 505 and second computing resource container 510 provide a plurality of computing resources 515, which may include computing devices 100 (shown in FIG. 1) and/or datastores such as first datastore 330 (shown in FIG. 3). For example, if the computing resources 515 are computing devices 105, computing resource containers 505, 510 may operate as distributed computing containers that allocate computing tasks (e.g., execution of software applications, such as VMs) to computing devices 105. If the computing resources 515 are datastores, computing resource containers 505, 510 may operate as data storage containers that allocate data storage tasks (e.g., storage of virtual disk files) to datastores.

Management device 320 is coupled in communication with first computing resource container 505 and second computing resource container 510 via network 315. In exemplary embodiments, management device 320 receives container information, such as available capacity (e.g., computing capacity and/or data storage capacity) from first computing resource container 505 and second computing resource container 510 but may not be capable of directly associating software applications with computing resources 515. Rather, to perform placement of a software application, management device 320 requests that first computing resource container 505, for example, associate the software application with some computing resource 515 to be selected by the first computing resource container 505.

Figure 6:
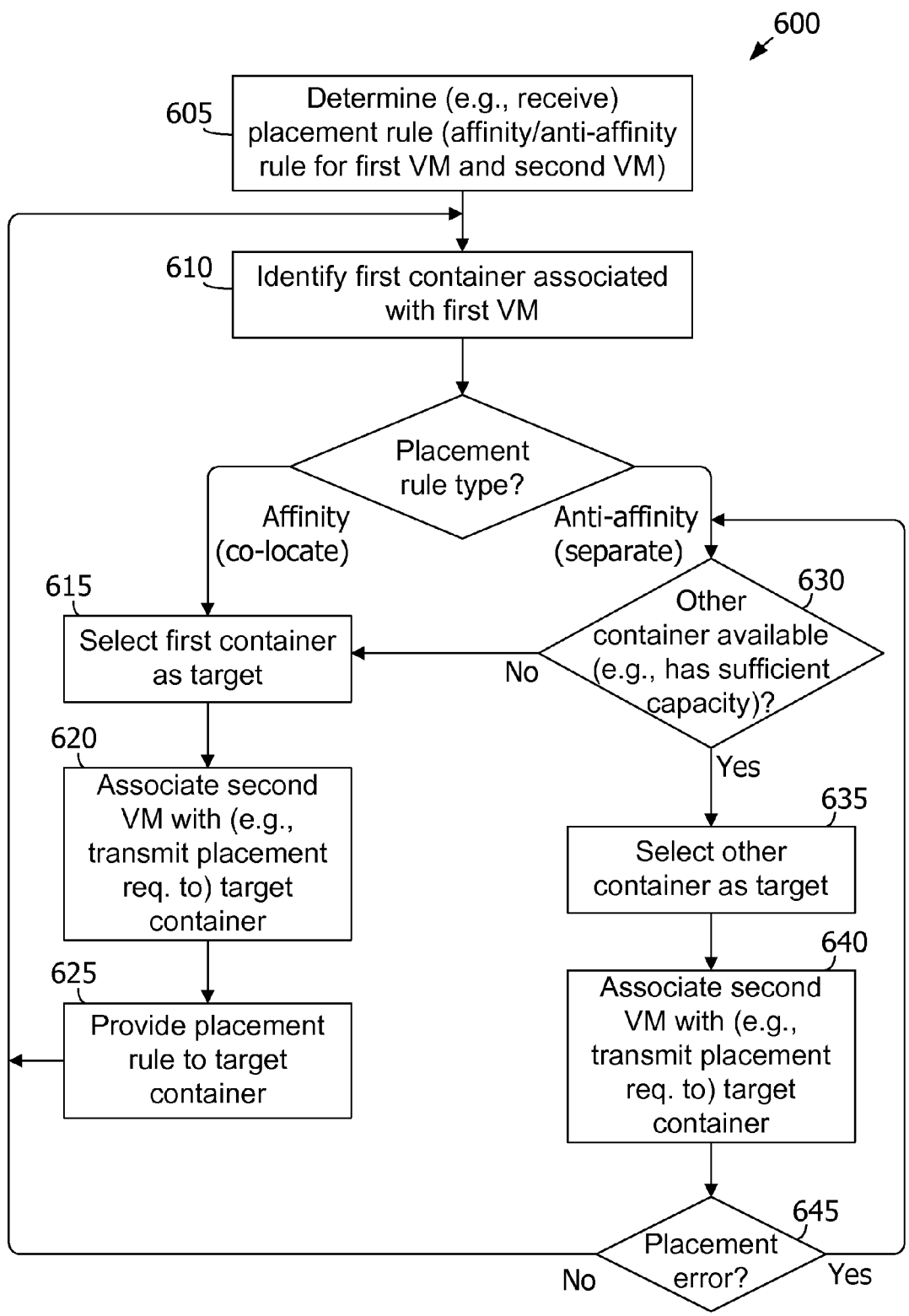
FIG. 6 is a flowchart of an exemplary method for associating a software application with a computing resource container based on a placement rule.

FIG. 6 is a flowchart of an exemplary method 600 for associating a software application with a computing resource container based on a placement rule. Referring to FIGS. 5 and 6, in exemplary embodiments, management device 320 determines 605 (e.g., receives via an input interface 114, shown in FIG. 1) a placement rule, such as an affinity rule indicating that a first software application (e.g., a first VM) is to be co-located with a second software application (e.g., a second VM) during execution of the first and second software applications, or an anti-affinity rule indicating that the first software application is to be separated from the second software application during execution of the first and second software applications.

Management device 320 identifies 610 the computing resource container that is associated with the first software application. For example, management device 320 may store associations of software applications and computing resource containers and/or may receive such associations from first computing resource container 505 and/or second computing resource container 510. In the scenario described, the first software application is associated with first computing resource container 505. For example, data (e.g., a virtual disk) associated with the first software application may be stored in first computing resource container 505, or the first software application may be currently executed by first computing resource container 505.

Management device 320 selects a target computing resource container based on the placement rule and the computing resource container identified 610 as associated with the first software application (e.g., first computing resource container 505).

In exemplary embodiments, when the first software application is to be co-located with the second software application (e.g., the placement rule is an affinity rule), management device 320 selects 615 the computing resource container that is associated with the first software application as the target computing resource container. Management device 320 associates 620 the second software application with the target computing resource container, such as by transmitting a placement request referencing the second software application to the target computing resource container, and provides 625 (e.g., transmits) the placement rule to the target computing resource container, such that the target computing resource container can associate the second software application with the same computing resource 515 with which the first software application is already associated.

When the first software application is to be separated from the second VM, management device 320 determines 630 whether a computing resource container other than the computing resource container that is associated with the first software application is available for placement of the second software application. For example, management device 320 may determine 630 whether another computing resource container has sufficient capacity to accommodate the second software application.

If another computing resource container is available, management device selects 635 the other computing resource container as the target computing resource container and associates 640 the second software application with the target computing resource container. In exemplary embodiments, placing the second software application in a computing resource container different from the one in which the first software application guarantees that the first software application and the second software application will be associated with different computing resources 515.

When the first VM is to be separated from the second VM, and no second computing resource container is available, management device 320 selects 615 the computing resource container associated with the first software application as the target computing resource container and associates 620 the second software application with the target computing resource container, as described above. In addition, management device 320 provides 625 the placement rule to the target computing resource container. Accordingly, even though the first and second software applications are placed in the same computing resource container, the computing resource container may enforce the placement rule by ensuring that the first and second software applications are associated with different computing resources 515, such as by performing method 400, described above with reference to FIG. 4.

Some embodiments facilitate recovering from errors in software application placement. For example, after associating 640 the second software application with a first target computing resource container, management device 320 may determine 645 that a placement error is received from the first target computing resource container in response to the placement request. In such a scenario, management device 320 determines 630 whether a computing resource container other than the computing resource container associated with the first software application is available for placement of the second software application, disregarding the first target computing resource container. Based on the determination 630, management device 320 proceeds as described above. For example, if the first target computing resource container is the only container other than the computing resource container associated with the first software application, management device 320 selects 615 the computing resource container associated with the first software application as a second target computing resource container.

As described above with reference to method 400 (shown in FIG. 4), some embodiments facilitate soft enforcement of an anti-affinity rule. In such embodiments, when the placement rule is an affinity rule, before associating 620 the second software application with the target computing resource container, management device 320 determines 617 whether such an association 620 will violate a rule other than the affinity rule being applied. The other rule may include another placement rule, a rule governing the load (e.g., resource utilization) associated with the target computing resource container, and/or any other rule enforced by management device 320. If no other rule will be violated, management device 320 proceeds to associate 620 the second software application with the target computing resource container. If another rule will be violated, management device 320 reports 618 a placement error. For example, management device 320 may store the placement error in a database, provide the placement error in a cluster management user interface, and/or transmit a notification of the placement error to another device (e.g., client device 325). Management device 320 proceeds to again identify 610 the computing resource container that is associated with the first software application and continues as described above.

When the placement rule is an anti-affinity rule, before associating 640 the second software application with the target computing resource container, management device 320 determines 637 whether such an association 640 will violate a rule other than the anti-affinity rule being applied. If no other rule will be violated, management device 320 proceeds to associate 640 the second software application with the target computing resource container. If another rule will be violated, management device 320 disregards the target computing resource container and proceeds to determine 630 whether another computing resource container other than the computing resource container that is associated with the first software application is available for placement of the second software application, as described above. Computing resource containers that have previously been selected 635, and for which placement of the second software application has been determined 637 to violate another rule, are considered unavailable. Accordingly, if placement of the second software application at each computing resource container other than the computing resource container that is associated with the first software application will result in a violation of a rule, management device 320 selects 615 the computing resource container that is associated with the first software application as the target computing resource container.

In exemplary embodiments, management device 320 performs method 600 repeatedly (e.g., periodically, continually, and/or upon request). Repeatedly performing method 600 facilitates detecting and responding to changing circumstances in cluster system 500. For example, management device 320 may determine 630 that a previously unavailable computing resource container has become available, or that a rule other than the placement rule will no longer be violated by placement of a software application at a particular computing resource container. As another example, management device 320 may identify 610 a change in the computing resource container with which a software application is associated. Such changes may result in a violation of a placement rule, which can be corrected by management device 320, as described above.

The methods described may be performed by computing devices 100 (shown in FIG. 1), such as management device 320 (shown in FIGS. 3 and 5). The computing devices communicate with each other through an exchange of messages and/or stored data. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary Operating Environment

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media are tangible and non-transitory and store information such as computer readable instructions, data structures, program modules, or other data. Communication media, in contrast, typically embody computer readable instructions, data structures, program modules, or other data in a transitory modulated data signal such as a carrier wave or other transport mechanism and include any information delivery media. Combinations of any of the above are also included within the scope of computer readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for associating a virtual machine (VM) with a computing resource, the system comprising:
a memory for storing a placement rule indicating one of the following: that a first virtual machine (VM) is to be co-located with a second VM during execution of the first and a second VM, or that the first VM is to be separated from the second VM during execution of the first and second VMs, wherein the first VM is associated with a first computing resource container; and
a processor coupled to the memory and programmed to:
when the first VM is to be co-located with the second VM, associate the second VM with the first computing resource container and provide the placement rule to the first computing resource container, wherein the first computing resource enforces the placement rule; and when the first VM is to be separated from the second VM and no second computing resource container is available, associate the second VM with the first computing resource container and provide the placement rule to the first computing resource container, wherein the first computing resource container enforces the placement rule.

2. The system of claim 1, wherein the processor is further programmed to determine that no second computing resource container is available at least in part by determining that no computing resource container other than the first computing resource container has sufficient capacity to accommodate the second VM.

3. The system of claim 1, wherein the processor is further programmed to:

receive a placement error from the second computing resource container in response to the placement request; and associate the second VM with a third computing resource container based on the received placement error.

4. The system of claim 1, wherein the processor is programmed to associate the second VM with the first computing resource container by associating the second VM with a data storage container.

5. The system of claim 1, wherein the processor is programmed to associate the second VM with the first computing resource container by associating the second VM with a distributed computing container.

6. A method comprising:

receiving, by a management device, a placement rule indicating that a first software application is to be separated from a second software application during execution of the first and second software applications;

selecting, by the management device, a target computing resource container for the second software application based on the placement rule, wherein the first software application is associated with the target computing resource container;

associating, by the management device, the second software application with the target computing resource container;

providing, by the management device, the placement rule to the target computing resource container; and enforcing, by the target computing resource container, the provided placement rule.

7. The method of claim 6, wherein selecting the target computing resource container comprises determining that no computing resource container other than the target computing resource container has sufficient capacity to accommodate the second software application.

8. The method of claim 7, wherein enforcing the provided placement rule comprises enabling the provided placement rule to be satisfied even though each of the first software application and the second software application are assigned to the target computing resource container.

9. The method of claim 6, further comprising:

transmitting a placement request to the target computing resource container;

receiving a placement error from the target computing resource container in response to the placement request; and selecting a second target computing resource container based further on the received placement error.

10. The method of claim 6, wherein associating the second software application with the target computing resource container comprises associating the second software application with a data storage container.

11. The method of claim 6, wherein associating the second software application with the target computing resource container comprises associating the second software application with a distributed computing container.

12. The method of claim 6, wherein selecting the target computing resource container comprises determining that no other rule will be violated by associating the second software application with the target computing resource container.

13. One or more computer-readable storage media having computer-executable instructions stored thereon, that when executed by a processor, instruct the processor to:

store a placement rule indicating that a first software application is to be separated from a second software application during execution of the first and second software applications;

select a target computing resource container for the second software application based on the placement rule, wherein the first software application is associated with the target computing resource container;

transmit a placement request associated with the second software application to the target computing resource container via a communication interface;

transmit the placement rule to the target computing resource container via the communication interface, wherein the target computing resource container enforces the placement rule; and enable the target computing resource container to enforce the transmitted placement rule.

14. The computer-readable storage media of claim 13, wherein selecting the target computing resource container is based further on no computing resource container other than the target computing resource container having sufficient capacity to accommodate the second software application.

15. The computer-readable storage media of claim 14, wherein the processor is further instructed to determine that no computing resource container other than the target computing resource container has sufficient capacity to accommodate the second software application.

16. The computer-readable storage media of claim 13, wherein selecting the target computing resource container is based further on receiving a placement error from a computing resource container other than the target computing resource container.

17. The computer-readable storage media of claim 13, wherein the second software application is associated with the target computing resource container by associating the second software application with a data storage container.

18. The computer-readable storage media of claim 13, the second software application is associated with the target computing resource container by associating the second software application with a distributed computing container.

* * * * *